US006832798B1

(12) United States Patent
Krause

(10) Patent No.: US 6,832,798 B1
(45) Date of Patent: Dec. 21, 2004

(54) PICKUP TRUCK RACK WITH ELEVATED PLATFORM WITHIN CANOPY

(76) Inventor: Joshua Krause, 7818 - 130th Ave. NE., Kirkland, WA (US) 98033

(*) Notice: Subject to any disclaimer, the term of this patent is extended or adjusted under 35 U.S.C. 154(b) by 0 days.

(21) Appl. No.: 10/700,404

(22) Filed: Nov. 4, 2003

(51) Int. Cl.$^7$ ............................................. B60R 9/042
(52) U.S. Cl. ...................... 296/3; 296/37.6; 296/37.7; 224/403
(58) Field of Search .................. 296/3, 37.6, 37.7, 296/100.01, 100.02, 100.17, 164, 167; 224/405, 403

(56) References Cited

U.S. PATENT DOCUMENTS

| | | | | |
|---|---|---|---|---|
| 3,589,576 A | * | 6/1971 | Rinkle et al. ................... | 296/3 |
| 4,065,041 A | * | 12/1977 | Stegavig et al. ................ | 296/3 |
| 4,378,127 A | * | 3/1983 | Rossi, Sr. ........................ | 296/3 |
| 4,773,575 A | * | 9/1988 | Morrison, III .............. | 224/405 |
| 5,172,952 A | * | 12/1992 | Lasnetski ................... | 296/37.7 |
| 5,207,470 A | * | 5/1993 | Rafi-Zadeh ................ | 296/37.7 |
| 5,423,587 A | * | 6/1995 | Ingram .......................... | 296/3 |
| 5,439,152 A | * | 8/1995 | Campbell ....................... | 296/3 |
| 5,476,301 A | * | 12/1995 | Berkich ......................... | 296/3 |
| 5,628,540 A | * | 5/1997 | James ............................ | 296/3 |
| 5,829,813 A | | 11/1998 | LaValle | |
| 5,893,598 A | | 4/1999 | Silkowski et al. | |
| 6,209,944 B1 | * | 4/2001 | Billiu et al. ........... | 296/100.02 |
| 6,224,140 B1 | * | 5/2001 | Hoplock ................ | 296/100.17 |

* cited by examiner

*Primary Examiner*—Lori L. Coletta
(74) *Attorney, Agent, or Firm*—David L. Tingey

(57) ABSTRACT

A truck rack with a platform mounts over a pickup bed and within a pickup canopy, leaving a generally unobstructed view through the pickup rear window. The platform is supported above the cab rear window in its store position but lowered on one end for loading as the other end pivots on a frame. To minimize valuable space within the canopy above the window, the platform locates in store position between upper frame members. In a preferred embodiment, the rack is supported in a supplemental frame that pivots on a primary frame forward in the truck bed. When released from a lock position, the rack moves longitudinally, forward and rearward in the truck bed, in the supplemental frame for ease of loading. The platform is supported in the supplemental frame by a wheel extending from each of the platform and the supplemental frame received in a corresponding channel in each of the platform and supplemental frame, respectively, such that the platform is supported by a wheels forward on the platform and rearward on the supplemental frame at all relative positions of the platform in the supplemental frame.

14 Claims, 7 Drawing Sheets

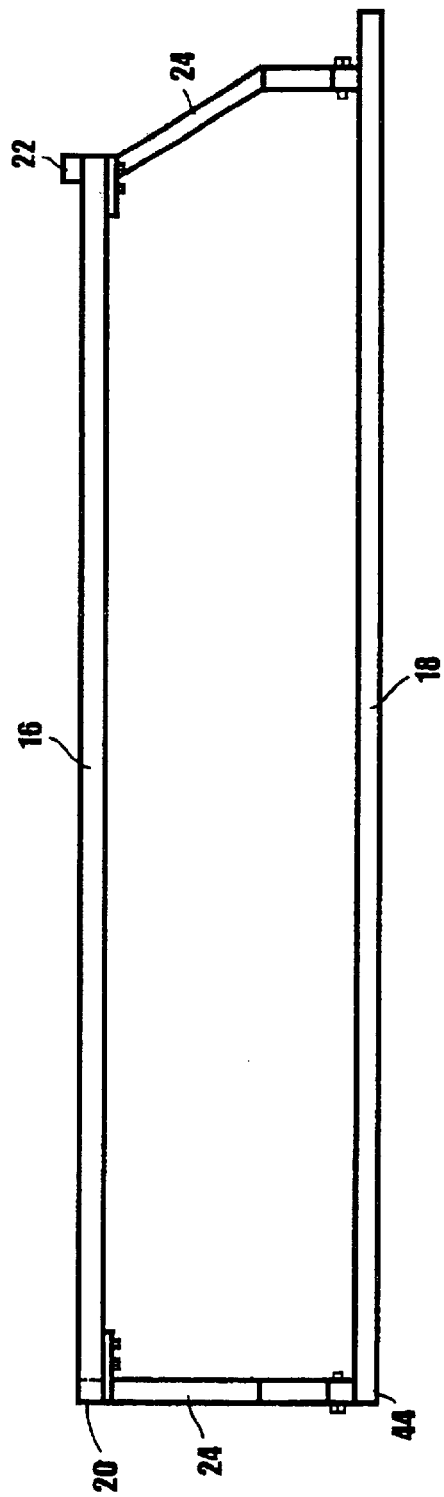
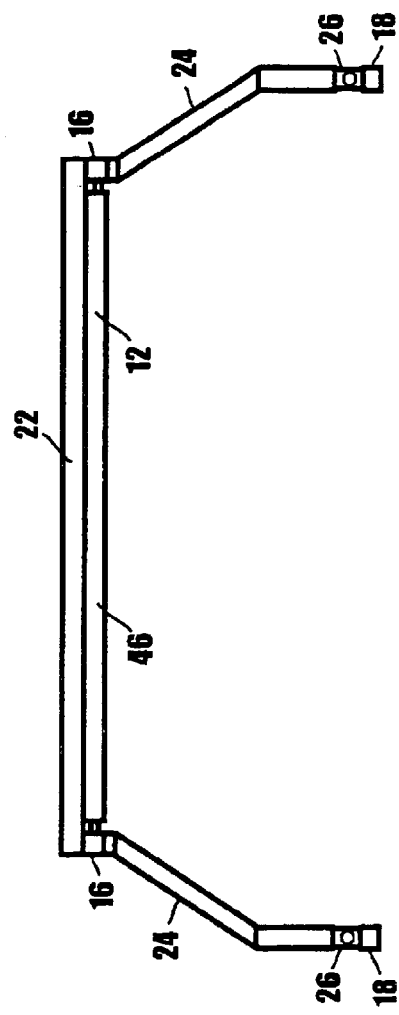
Fig. 3
Fig. 4

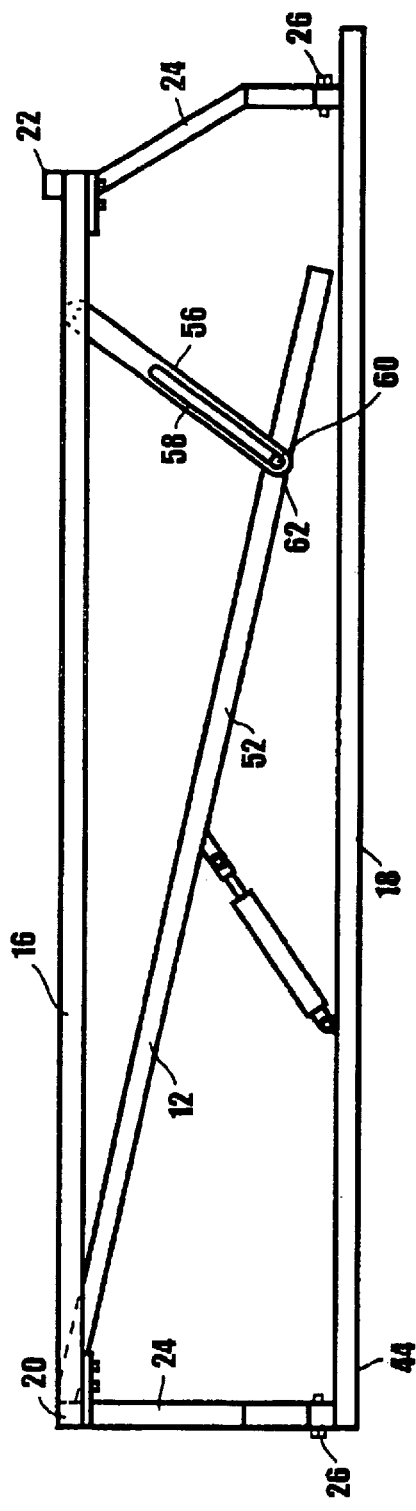
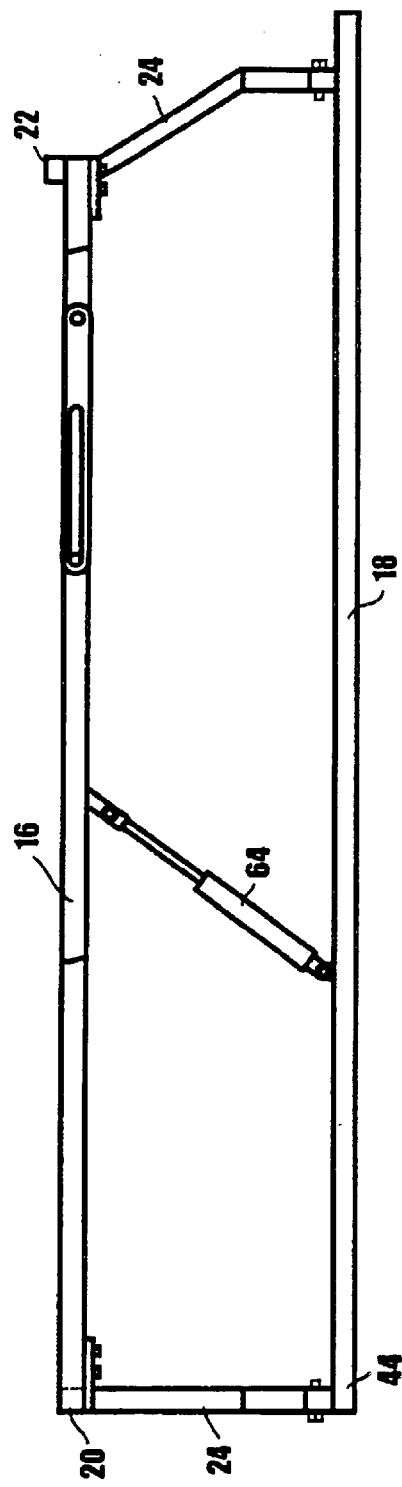

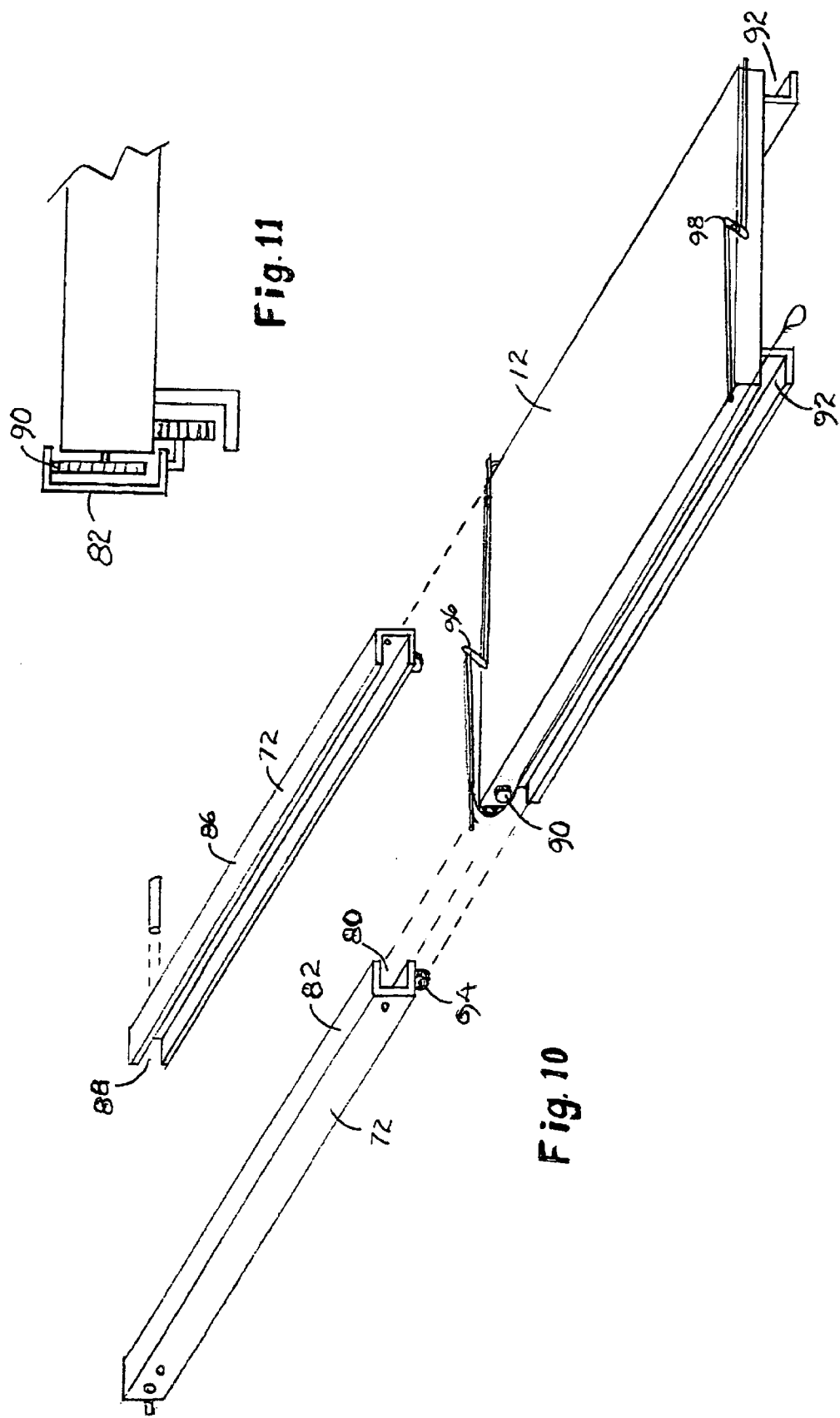

PICKUP TRUCK RACK WITH ELEVATED PLATFORM WITHIN CANOPY

BACKGROUND

1. Field of the Invention

This invention relates to pick truck racks and, more particularly, pickup truck racks suitable for use inside canopies mounted on a pickup truck bed.

2. Prior Art

It is well known to have truck racks for pickup trucks. Truck racks generally provide a frame elevated above the truck bed on which various cargos can be carried. Typically, such racks are positioned over the cab rear window to the truck driver still has full view through his rear window. It is also well known to have canopies that mount over a pickup truck bed on bed sides. (For purposes herein, a truck "canopy" is construed in the normal vernacular as that which is mounted as an enclosure over a truck bed, including a roof and sides around a support structure together comprising the whole of a truck canopy.) The canopy adds a measure of security for cargo carried in the truck bed and also offers protection from the weather. However, use of the canopy also generally limits the area in which cargo can be carried. Conventional truck racks are generally not compatible with use of a canopy, though it is known to have a truck rack that mounts around and outside of a canopy. It is not common however to have a rack that mounts over the truck bed inside of a canopy also mounted over the truck bed, thus offering the security and protection of a canopy for cargo loaded onto the rack while still providing full view to the rear of the truck through the truck rear window.

SUMMARY OF THE INVENTION

It is the primary object of the present invention to provide a truck rack with a platform, that is, a raised flooring, over a pickup bed and within a pickup canopy. To accommodate a generally unobstructed view through the pickup rear window, it is a second object that the platform be mounted above the rear window but still within the pickup canopy. These objects are achieved in a frame supporting a platform supported above the cab rear window in normal use but lowered for loading. Thus, the bed of the truck is still available for normal use in hauling materials and relatively large parts and equipment, while smaller parts and equipment may be stored above the truck bed on the supplemental platform over the bed and above the cab window.

It is a third object that the platform be accessible for easy loading. This object is achieved in the platform pivoting on pivot pins from a primary frame first end at a platform first end between (a) a store position with a platform second end latched to a frame second end securing the platform within the channel between the frame side members and (b) a loading position with the platform second end unlatched and lowered from the primary frame. In a preferred embodiment, the rack is supported in a supplemental frame that pivots on the pivot pin on the primary frame forward in the truck bed. When released from a lock position, the rack moves longitudinally, forward and rearward in the truck bed, in the supplemental frame for ease of loading. The platform is supported in the supplemental frame by a wheel extending from each of the platform and the supplemental frame received in a corresponding channel in each of the platform and supplemental frame, respectively, such that the platform is supported by a wheels forward on the platform and rearward on the supplemental frame at all relative positions of the platform in the supplemental frame.

BRIEF DESCRIPTION OF THE DRAWINGS

FIG. 3 is a side plan view of the frame with platform.

FIG. 4 is an end plan view of the frame with platform.

FIG. 5 is a side view of the frame in its store position showing a load assist member and a support member.

FIG. 6 is a side view of the frame showing the platform lowered to its loading position, hanging on its support member and assisted in lifting by its assist member.

FIG. 10 is a perspective view of the platform and supplemental frame of FIG. 9 shown in exploded view.

FIG. 11 is a partial end view of the platform and supplemental frame of FIG. 9.

DETAILED DESCRIPTION OF PREFERRED EMBODIMENTS

Figure 1:
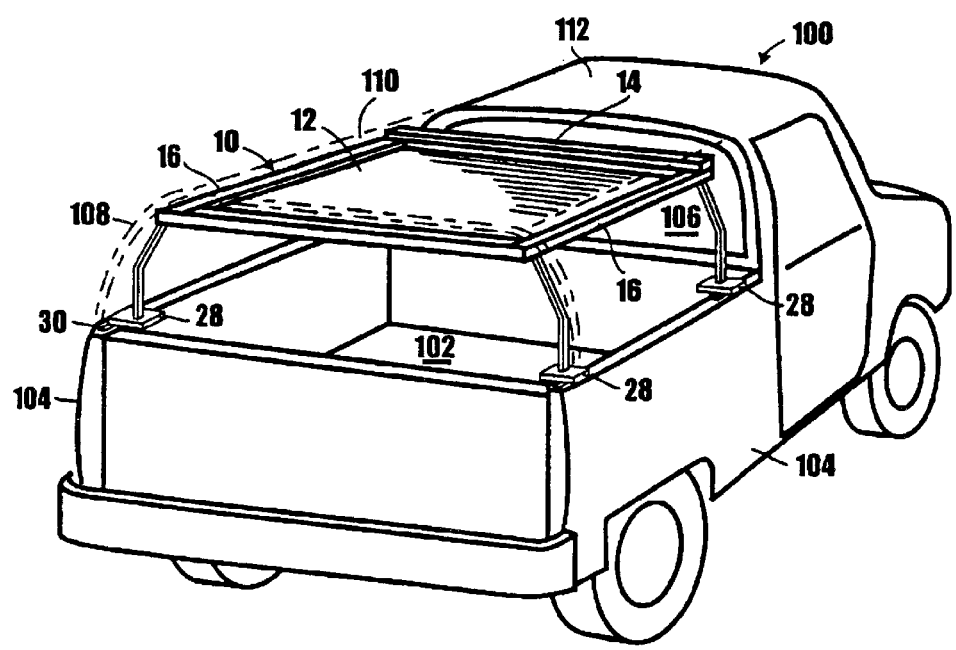
FIG. 1 is a perspective view of the rack on a pickup truck bed under a canopy.
Figure 2:
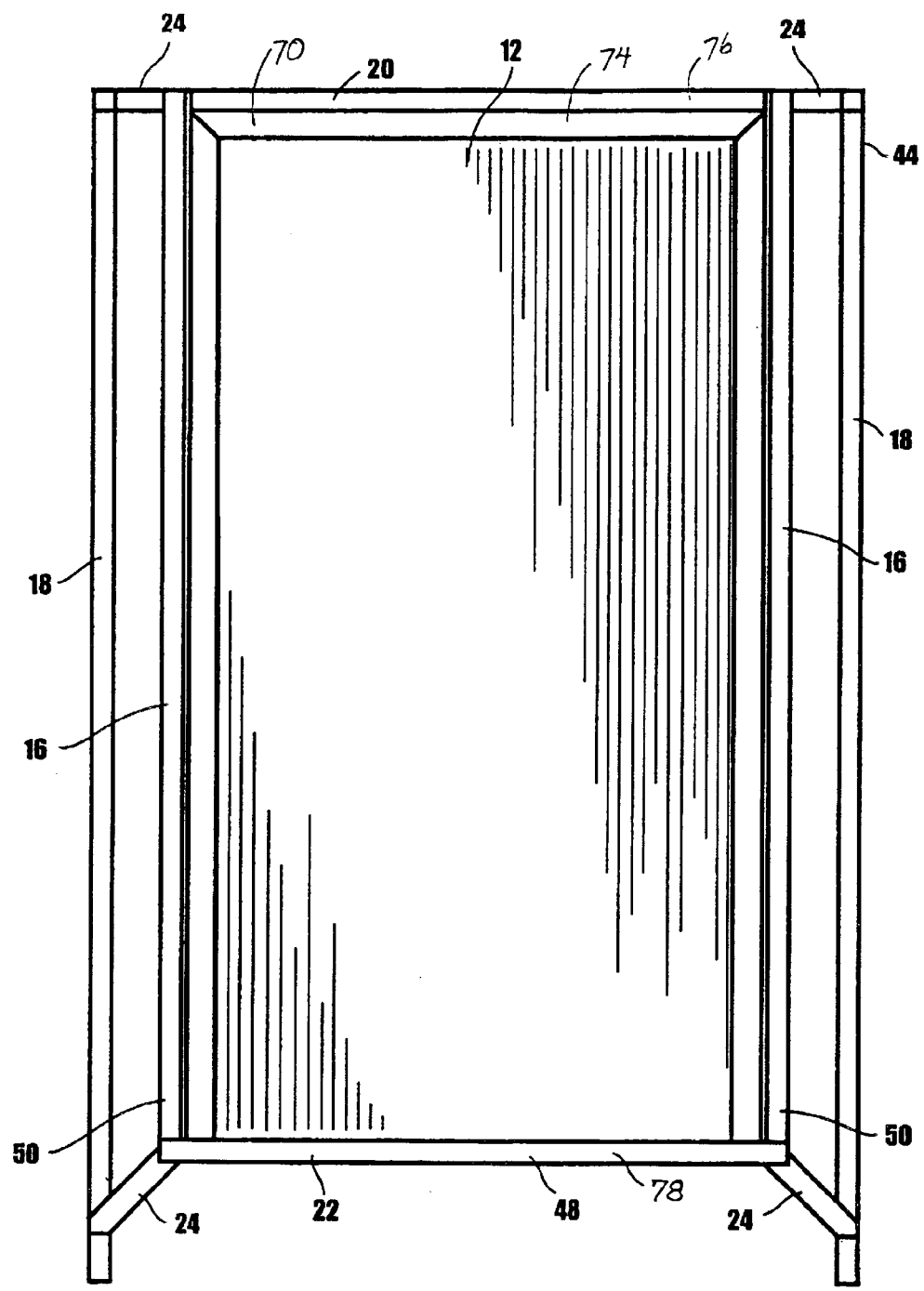
FIG. 2 is a top plan view of the frame with platform.
Figure 7:
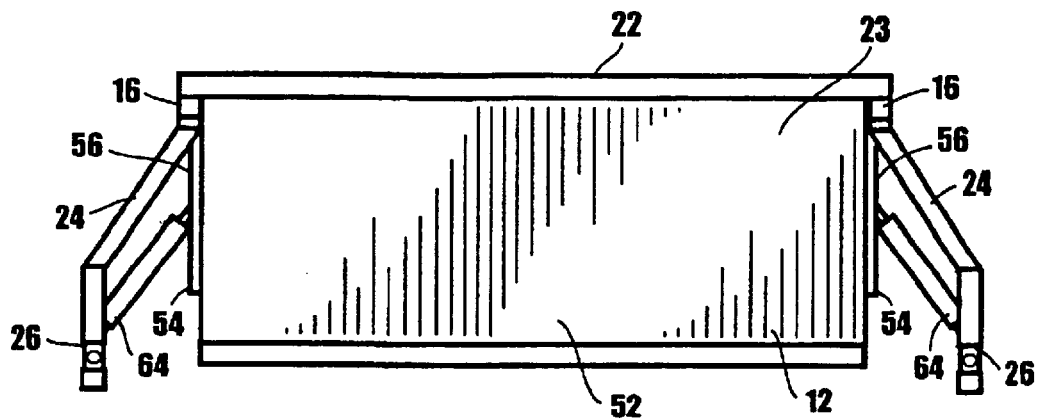
FIG. 7 is an end view of the frame with the platform in load position.
Figure 8:
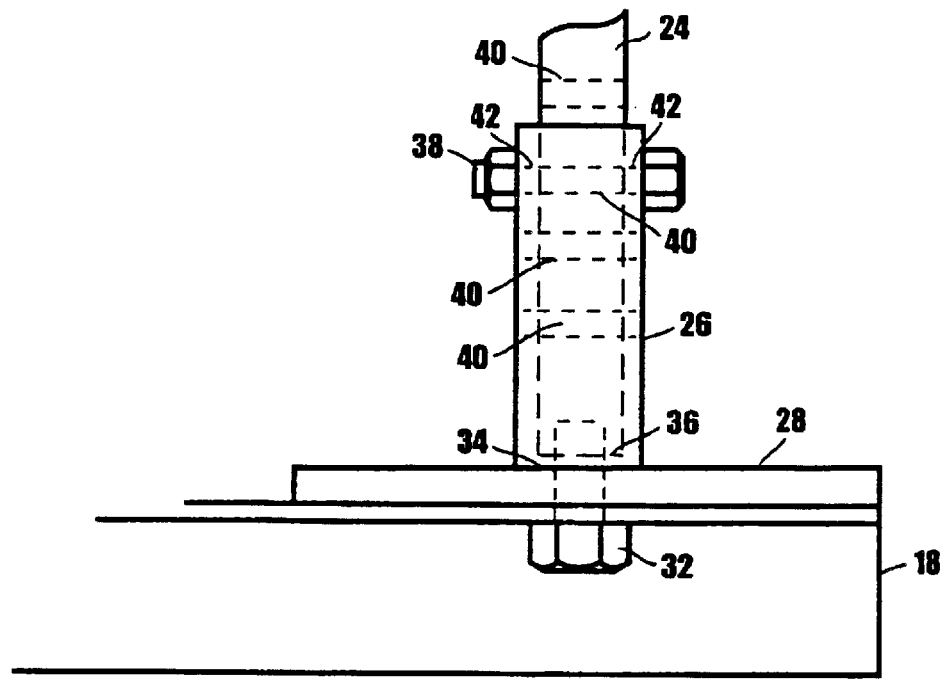
FIG. 8 is an end view the frame leg with a plurality of holes received into a mounting bracket with a sleeve, a bolt passing through a sleeve hole and an aligned selective leg hole.
Figure 9:
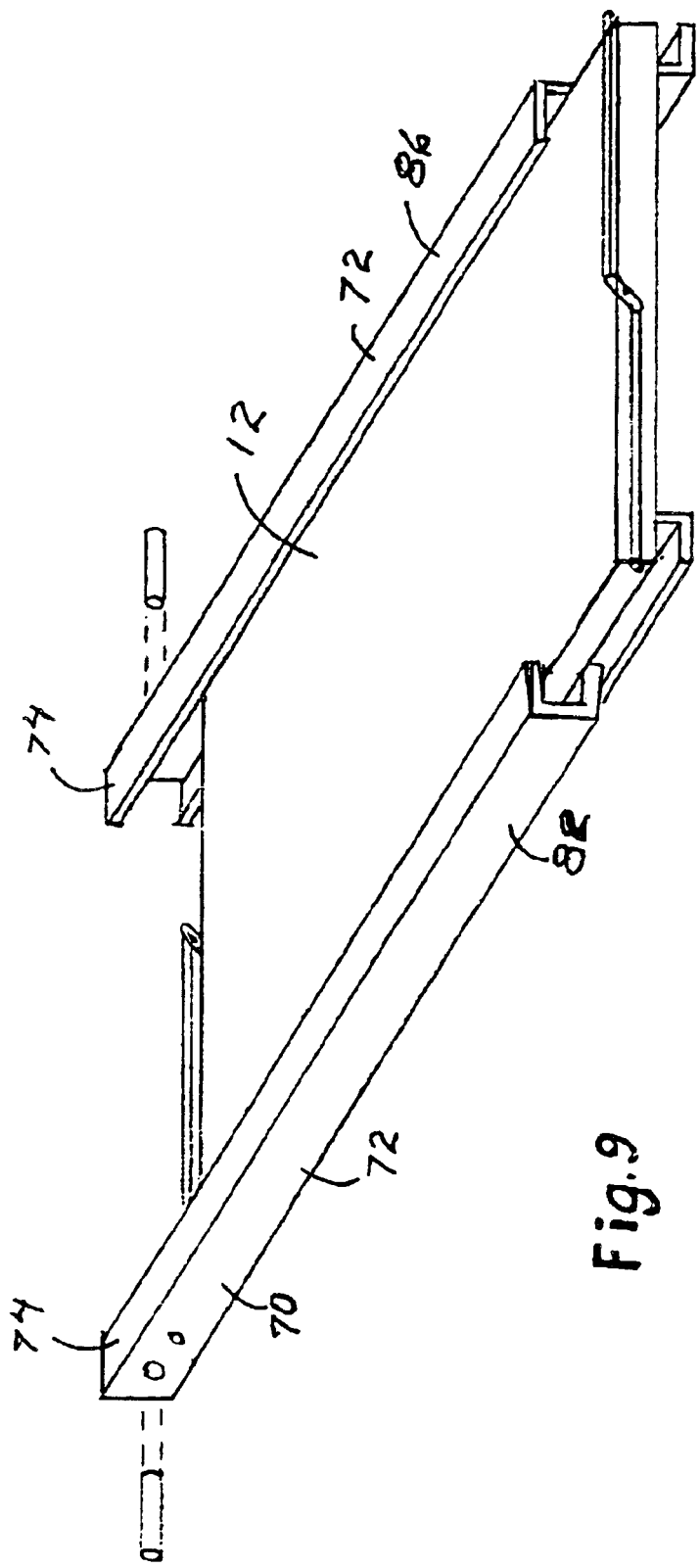
FIG. 9 is a perspective view of the platform in a supplemental frame, shown with pivot pins that pivotably connect the supplemental frame to the primary frame.

The truck rack 10 of the present invention is intended for use with a pickup truck 100 with a pickup bed 102 and bed sides 104. The pickup truck 100 includes a rear window 106 in its cab and a canopy 108 on its bed resting on the bed sides with a roof 110 that reaches at least the roof 112 of the cab. The rack 10, additional to and separate and apart from and enclosed by the canopy, provides a platform 12 mounted over the truck bed 102 independent of and within the canopy 108, providing an additional area on which various parts may be carried within the security and protection of the canopy. So the platform 12 and parts carried on the platform do not obstruct view through the rear window, a primary frame 14 supports the platform 12 above the rear window 106 generally. However, it is recognized that the platform 12 may locate slightly within the window, a small distance below the top of the window while virtually leaving of the window clear of the shelf and still provide a clear view to the rear of the pickup. This circumstance is deemed within the meaning of the term 'above the rear window' and intended to be included in the bounds of the invention.

The primary frame 14 of the truck rack 10 is mountable on the truck bed sides 104 within the canopy 108, which is also mounted on the truck sides 104. The primary frame 14 comprises upper and lower parallel side members 16 and 18 and first and second cross members 20 and 22 extending between upper parallel side members 16. The lower parallel side members 18 are mountable to the bed sides and the second cross member 22 lies over the upper parallel side members 16 to form an inverted U channel 23. Frame legs 24 support the side members 20 and 22 over the truck bed 102, extending between the upper and lower side members 16 and 18. The legs 24 are length-adjustable so the upper parallel side members 16 and cross members 20 and 22 can be positioned above the rear window of the cab and adapt to trucks of different dimensions.

Because truck beds from differing manufacturers have varying dimensions, for the rack to fit universally in the several beds, attachment of the frame legs 24 to the bed 102 must also be adjustable transversely. To achieve the transverse adjustment while retaining use of a common frame, a plurality of sleeves 26 are mountable to bracket plates 28 secured to the bed sides 102, extending inward from the bed sides, each having a transverse slot 30. A plate bolt 32 through the slot 30 at a preferred position along the slot is tightened into a threaded hole 34 in the sleeve base 36, thus securing the sleeve in a selective transverse position on the bracket plate 28. The bracket plate 28 is typically affixed to the lower parallel side member 18 which is member mountable to the bed side, typically by bolting the member 18 to the side cap or the bracket plate 28 may be bolted directly to the bed side 102 without use of the lower parallel side member 18. To achieve a frame height adjustment, the legs fit into the sleeves, respectively. A sleeve bolt 38 passes through a leg hole 40 selected from a plurality of leg holes through the frame legs 24, and through a matching sleeve hole 42.

For ease of loading and general access to the platform, the platform 12 pivots at a platform first end 44 from the upper parallel side members 16 near the cab rear window 106 between (a) a store position 46 with a platform second end 48 latched to a primary frame second end 50 securing the platform 12 within the channel 23 between the primary frame upper parallel side members 16 and (b) a load position 52 with the platform second end 48 unlatched and lowered from the primary frame. As indicated, the height of the store position of the platform 12 is generally adjusted by the leg length to be above the truck rear window and below the canopy roof to provide an unobstructed view rearward through the truck window and under the platform.

In its load position 52, the unlatched platform second end 48 is supported by support members 56 on each platform side 54 connected between the platform side 54 and the respective upper side member 16. The support member 56 may be a simple strap, or it may comprise a rigid bar with a longitudinal slot 58, in which case a slot pin 60 extends from the upper side member 16 and through the slot 58, sliding in the slot as the platform 12 moves between its store and loading positions, resting on a slot end 62 to support the platform 12 hanging by the support member 56.

The truck rack also may include a lift assist member 64 on each side between the platform 12 and one of the lower parallel side members 18. The lift assist member 64 may include any assist mechanism, such as a spring that is compressed as the platform 12 moves from its store position to its load position 52, which releases its compression energy to assist the platform 12 as it moves from its load position to its store position.

In a preferred embodiment, the truck rack further comprises a supplemental frame 70 including supplemental frame parallel side members 72 supporting the platform 12 therebetween with a first end 74 pivoting from said upper parallel side members 16 at a primary frame first end 76 forward in the truck bed 102 inside the canopy 108 between said store position 46 and said load position 52. A supplemental frame second end 78 lowers from a primary frame second end 50 rearward in the truck bed 102. The store position of the supplemental frame 70 generally locates the supplemental frame above the truck rear window and below the canopy roof providing unobstructed view rearward through the truck window and under the supplemental frame, the canopy covering the platform. The supplemental frame 70 includes an inward directed frame channel 80 on one parallel side member 82 opposing an inward directed frame channel 88 on the other parallel side member 86, together receiving the platform 12 therebetween slidably in the channels 80, 88. The platform 12 moves longitudinally between forward and rearward positions in the supplemental frame 70 as a raised flooring.

The supplemental frame inward directed channel 88 as a supplemental frame first member receives a platform wheel 90 rotatably mounted forward on each side of the platform 12 as a matching platform first member with the supplemental frame first member, or channel 88, supporting the platform first member, or platform wheel 90, in sliding engagement, together comprising a first support set. Similarly, a platform outward directed channel 92, or platform second member, receives a supplemental frame wheel 94, or supplemental frame second member, rearward on the supplemental frame 70 rotatable under each supplemental frame parallel side member 72 extending inward therefrom. The platform 12 rests on the supplemental frame wheel 94 in sliding engagement, together comprising a second support set. (For all purposes herein, "sliding" is meant to include rolling, such as a wheel rolling in a channel.) Thus, said first and second supports sets each provides separate and redundant sliding support engagement between the supplemental frame 70 and the platform 12 as wheels 90 and 94 riding on the channels 88 and 92 support the platform 12 as the platform 12 moves longitudinally along the supplemental frame 70. The platform 12 is supported by the supplemental frame 70 by both support sets at all positions of the platform 12 relative to the supplemental frame 70 as the platform 12 moves longitudinally relative to the supplemental frame 70. Thus, when the platform 12 moves rearward telescoping partially out of the opposing channels 80 of the parallel side members 82, the platform 12 extending away from the parallel side members 82, the platform 12 is supported by the platform rearward portion weighing down on the respective rearward wheels 94 of the parallel side members 82 of the supplemental frame 70 and the respective wheels 90 forward on the platform 12 urges upward against the channels 88, 80 of the parallel side members 82. It is noted that the respective wheels 90 and 94 in the their corresponding channels 88 and 92 form redundant first and second support sets that are functionally symmetric with the wheel 92 from the platform 12 received rollably in the channel 88 in the parallel side member 82 and, vice versa, the wheel 94 from the parallel side member 82 of the supplemental platform 70 is received rollably in the channel 88 of the platform 12.

A forward latch 96 and a rearward latch 98 between the platform 12 and the supplemental frame 70, redundantly secure the platform releasably in an unextended position relative to the supplemental frame 70. Both latches are releasable from rearward of the supplemental frame 70.

Having described the truck rack, what is claimed is:

1. A truck rack for use with a pick-up truck having a bed with sides and a rear window in a truck cab forward of the truck bed with a canopy having a roof and sides mounted on the truck bed, the improvement comprising, a primary frame, including upper parallel side members, separate and apart from, within, enclosed by and additional to the canopy, a supplemental frame comprising supplemental frame parallel side members supporting a platform therebetween with a first end pivoting from said upper parallel side members at a primary frame first end forward in the truck bed inside the canopy between a store position and a load position, a supplemental frame second end lowering from a primary frame second end rearward in the truck bed, the store position of the supplemental frame generally locating the supplemental frame above the truck rear window and below the canopy roof providing unobstructed view rearward through the truck window and under the supplemental frame, the canopy covering the platform, the platform movable longitudinally between forward and rearward in the supplemental frame as a raised flooring above the truck rear window and below the canopy roof, the platform providing unobstructed view rearward through the truck window while supporting a load under the canopy raised above the truck bed.

2. The truck rack of claim 1 in which the primary frame is mountable directly to the sides of truck bed within the canopy.

3. The truck rack of claim 1 wherein the supplemental frame pivots from the primary frame first end at a supplemental frame first end between (a) said store position with said supplemental second end latched to said primary frame second end securing the supplemental frame between the primary frame upper side members and (b) said load position with a second frame second end lowered from the primary frame.

4. The truck rack of claim 1 further comprising a supplemental frame first member receiving a matching platform first member with the supplemental frame first member supporting the platform first member in sliding engagement, comprising a first support set, and a platform second member receiving a supplemental frame second member in sliding engagement, comprising a second support set, wherein said first and second supports sets each provides separate and redundant sliding support engagement between the supplemental frame and the platform, the platform being supported by the supplemental frame by both support sets at all positions of the platform relative to the supplemental frame as the platform moves longitudinally relative to the supplemental frame.

5. The truck rack of claim 4 in which the supplemental frame first member comprises in supplemental frame parallel side members opposing inward directed frame channels receiving the platform therebetween slidably in the channels.

6. The truck rack of claim 4 in which the platform first member comprises a wheel rotatably mounted on each side of the platform and respectively received into frame channels, the wheels riding on the channels in support of the platform as the platform moves longitudinally along the supplemental frame.

7. The truck rack of claim 4 in which the supplemental frame second member comprises a platform support member under each supplemental frame parallel side member extending inward therefrom and in which the platform second member comprises outward directed frame channels running longitudinally on each platform side under the platform receiving the platform support member therein.

8. The truck rack of claim 7 in which the platform support member comprises a wheel rotatable under each supplemental frame parallel side member and extending inward respectively into the outward directed frame channels.

9. The truck rack of claim 8 wherein the second support set is functionally symmetric with the first support set as the wheel from each platform side is received rollably in its matching channel in the respective parallel side member as the wheel from each parallel side member is received rollably in the matching channel of each platform side, respectively.

10. The truck rack of claim 8 wherein wheel on the platform is mounted forward on the platform.

11. The truck rack of claim 8 wherein the wheel on the parallel side member is mounted rearward on the parallel side member.

12. The truck rack of claim 11 wherein the wheel on the platform is mounted forward on the platform such that when the platform moves rearward telescoping partially out of the opposing channels of the parallel side members, the platform extending away from the parallel side members is supported by the platform rearward portion weighing down on the respective rearward wheels of the parallel side members and the respective wheels forward on the platform urges upward against the channels of the parallel side member.

13. A truck rack for use with a pick-up truck having a bed with sides and a rear window in a truck cab forward of the truck bed with a canopy having a roof and sides mounted on the truck bed, the improvement comprising, a primary frame adapted to mount directly to the sides of truck bed within the canopy, including upper parallel side members, separate and apart from, within, enclosed by and additional to the canopy, a supplemental frame comprising supplemental frame parallel side members supporting a platform therebetween with a first end pivoting from said upper parallel side members at a primary frame first end forward in the truck bed inside the canopy between a store position and a load position, a supplemental frame second end lowering from a primary frame second end rearward in the truck bed, the store position of the supplemental frame generally locating the supplemental frame above the truck rear window and below the canopy roof providing unobstructed view rearward through the truck window and under the supplemental frame, the canopy covering the platform, an inward directed frame channel on one parallel side member opposing an inward directed frame channel on the other parallel side member, together receiving the platform therebetween slidably in the channels, the platform movable longitudinally between forward and rearward in the supplemental frame as a raised flooring above the truck rear window and below the canopy roof, the platform providing unobstructed view rearward through the truck window while supporting a load under the canopy raised above the truck bed, a supplemental frame first member receiving a matching platform first member with the supplemental frame first member supporting the platform first member in sliding engagement, comprising a first support set, and a platform second member receiving a supplemental frame second member in sliding engagement, comprising a second support set, wherein said first and second supports sets each provides separate and redundant sliding support engagement between the supplemental frame and the platform, the platform being supported by the supplemental frame by both support sets at all positions of the platform relative to the supplemental frame as the platform moves longitudinally relative to the supplemental frame, the platform first member further comprising a wheel rotatably mounted forward on each side of the platform and respectively received into frame channels, the wheels riding on the frame channels in support of the platform as the platform moves longitudinally along the supplemental frame, the supplemental frame second member further comprising a wheel rearward rotatable under each supplemental frame parallel side member extending inward therefrom on which the platform rests, such that when the platform moves rearward telescoping partially out of the opposing channels of the parallel side members, the platform extending away from the parallel side members is supported by the platform rearward portion weighing down on the respective rearward wheels of the parallel side members and the respective wheels forward on the platform urges upward against the channels of the parallel side member.

14. The truck rack of claim 13 further comprising a forward latch and a rearward latch between the platform and the supplemental frame, redundantly securing the platform releasably in an unextended position relative to the supplemental frame, both latches releasable from rearward of the supplemental frame.

* * * * *